US009561847B2

(12) United States Patent
Freund

(10) Patent No.: US 9,561,847 B2
(45) Date of Patent: Feb. 7, 2017

(54) SYSTEMS AND METHODS FOR CONTROLLING A MAGNITUDE OF A SONIC BOOM

(71) Applicant: Gulfstream Aerospace Corporation, Savannah, GA (US)

(72) Inventor: Donald Freund, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 363 days.

(21) Appl. No.: 14/176,865

(22) Filed: Feb. 10, 2014

(65) Prior Publication Data

US 2014/0224926 A1    Aug. 14, 2014

Related U.S. Application Data

(60) Provisional application No. 61/764,659, filed on Feb. 14, 2013.

(51) Int. Cl.
*B64C 17/10* (2006.01)
*B64C 23/00* (2006.01)
(Continued)

(52) U.S. Cl.
CPC ............... *B64C 23/00* (2013.01); *B64C 3/185* (2013.01); *B64C 3/20* (2013.01); *B64C 3/38* (2013.01);
(Continued)

(58) Field of Classification Search
None
See application file for complete search history.

(56) References Cited

U.S. PATENT DOCUMENTS 2,665,085 A * 1/1954 Crocombe et al. ............. 244/49
3,053,484 A * 9/1962 Alford, Jr. et al. ........... 244/218
(Continued)

FOREIGN PATENT DOCUMENTS

JP    2005297825 A    10/2005
WO    2005065071 A2    7/2005

OTHER PUBLICATIONS

United States International Searching Authority, International Search Report and Written Opinion mailed May 21, 2014 for International Application No. PCT/US2014/015597.

(Continued)

*Primary Examiner* — Medhat Badawi
(74) *Attorney, Agent, or Firm* — Ingrassia, Fisher & Lorenz PC

(57) ABSTRACT

A system for controlling a magnitude of a sonic boom includes a first sensor configured to detect a first condition of the supersonic aircraft. The system further includes a pair of wings configured to move fore and aft. The system further includes a processor communicatively coupled with the sensor and operatively coupled with the pair of wings. The processor is configured to (1) receive a first information from the first sensor indicative of the first condition, (2) calculate a lift distribution of the supersonic aircraft based on the first information, (3) determine an existence of a deviation of the lift distribution from a desired lift distribution based on the flight condition, and (4) control the pair of wings to move to redistribute the lift in a manner that more closely conforms to the desired lift distribution. The magnitude of the sonic boom is reduced when the deviation is reduced.

20 Claims, 11 Drawing Sheets

(51) Int. Cl.

| | | |
|---|---|---|
| *B64C 30/00* | (2006.01) | |
| *B64D 37/00* | (2006.01) | |
| *B64C 3/38* | (2006.01) | |
| *B64C 3/42* | (2006.01) | |
| *B64C 9/00* | (2006.01) | |
| *B64C 3/18* | (2006.01) | |
| *B64C 3/20* | (2006.01) | |

(52) U.S. Cl.
CPC . *B64C 3/42* (2013.01); *B64C 9/00* (2013.01); *B64C 17/10* (2013.01); *B64C 30/00* (2013.01); *B64D 37/00* (2013.01); *Y02T 50/145* (2013.01); *Y02T 50/44* (2013.01)

(56) References Cited

U.S. PATENT DOCUMENTS

| | | | | |
|---|---|---|---|---|
| 3,188,025 | A | * | 6/1965 | Moorehead ............... 244/55 |
| 3,215,369 | A | * | 11/1965 | Johnson ............... 244/15 |
| 3,310,262 | A | * | 3/1967 | Robins et al. ............... 244/45 R |
| 3,447,761 | A | * | 6/1969 | Wadleigh et al. ............... 244/15 |
| 3,493,197 | A | * | 2/1970 | Spearman ............... 244/218 |
| 3,737,119 | A | * | 6/1973 | Cheng ............... 244/1 N |
| 3,870,253 | A | * | 3/1975 | Leidy et al. ............... 244/46 |
| 3,954,231 | A | * | 5/1976 | Fraser ............... 244/225 |
| 4,598,886 | A | * | 7/1986 | Friebel et al. ............... 244/15 |
| 4,735,381 | A | * | 4/1988 | Wood ............... 244/130 |
| 5,740,984 | A | * | 4/1998 | Morgenstern ............... 244/1 N |
| 5,899,410 | A | * | 5/1999 | Garrett ............... 244/45 R |
| 6,114,050 | A | * | 9/2000 | Westre et al. ............... 428/608 |
| D471,854 | S | * | 3/2003 | Rouleau et al. ............... D12/319 |
| 6,588,703 | B1 | * | 7/2003 | Hartmann ............... 244/35 R |
| 6,698,684 | B1 | * | 3/2004 | Henne et al. ............... 244/1 N |
| 6,913,228 | B2 | | 7/2005 | Lee et al. |
| 7,004,428 | B2 | * | 2/2006 | Tracy et al. ............... 244/35 R |
| 7,252,263 | B1 | | 8/2007 | Hagemeister et al. |
| 2002/0096598 | A1 | * | 7/2002 | Nelson ............... 244/15 |
| 2004/0245380 | A9 | | 12/2004 | Hartmann et al. |
| 2005/0045763 | A1 | * | 3/2005 | Morgenstern et al. ............... 244/10 |
| 2005/0051666 | A1 | * | 3/2005 | Lee et al. ............... 244/10 |
| 2005/0067525 | A1 | * | 3/2005 | Morgenstern et al. ............... 244/10 |
| 2005/0067526 | A1 | * | 3/2005 | Quayle et al. ............... 244/15 |
| 2005/0103929 | A1 | * | 5/2005 | Chang et al. ............... 244/15 |
| 2005/0116108 | A1 | * | 6/2005 | Morgenstern et al. ............... 244/130 |
| 2005/0151029 | A1 | | 7/2005 | Tracy et al. |
| 2005/0230531 | A1 | * | 10/2005 | Horinouchi ............... 244/47 |
| 2005/0274844 | A1 | * | 12/2005 | Stuhr ............... 244/46 |
| 2006/0157613 | A1 | * | 7/2006 | Adamson et al. ............... 244/1 N |
| 2006/0237580 | A1 | | 10/2006 | Cuccias et al. |
| 2007/0252028 | A1 | | 11/2007 | Morgenstern |
| 2007/0262207 | A1 | * | 11/2007 | Morgenstern et al. ............... 244/214 |
| 2010/0243795 | A1 | * | 9/2010 | McDonnell ............... 244/36 |
| 2011/0095137 | A1 | * | 4/2011 | Tracy et al. ............... 244/35 R |
| 2011/0133021 | A1 | * | 6/2011 | Lugg ............... 244/13 |
| 2012/0091270 | A1 | * | 4/2012 | Moore et al. ............... 244/1 N |
| 2012/0290153 | A1 | * | 11/2012 | Olsoe et al. ............... 701/3 |
| 2013/0034684 | A1 | | 2/2013 | Meyer et al. |
| 2013/0341459 | A1 | * | 12/2013 | Kosheleff ............... 244/36 |

OTHER PUBLICATIONS

United States International Searching Authority, International Search Report and Written Opinion mailed May 29, 2014 for International Application No. PCT/US2014/015585.
United States International Searching Authority, International Search Report and Written Opinion mailed May 21, 2014 for International Application No. PCT/US2014/015600.
United States Patent and Trademark Office, Non-Final Office Action for U.S. Appl. No. 14/176,843, mailed May 7, 2015.
USPTO, Office Action for U.S. Appl. No. 14/176,879 mailed Aug. 21, 2015.
The International Bureau of WIPO, International Preliminary Report on Patentability for International Application No. PCT/US2014/015597 mailed Aug. 27, 2015.
The International Bureau of WIPO, International Preliminary Report on Patentability for International Application No. PCT/US2014/015585 mailed Aug. 27, 2015.
The International Bureau of WIPO, International Preliminary Report on Patentability for International Application No. PCT/US2014/015600 mailed Aug. 27, 2015.
USPTO, Final Office Action in U.S. Appl. No. 14/176,879 mailed Jan. 29, 2016.
USPTO, Response to Office Action in U.S. Appl. No. 14/176,879 mailed Dec. 21, 2015.

* cited by examiner

SYSTEMS AND METHODS FOR CONTROLLING A MAGNITUDE OF A SONIC BOOM

CROSS-REFERENCE TO RELATED APPLICATION

This application claims the benefit of U.S. Provisional Patent Application 61/764,659 filed 14 Feb. 2013 and entitled "Aeroelastic Tailoring With Active Control For Sonic Boom Mitigation", which is hereby incorporated herein by reference in its entirety.

TECHNICAL FIELD

The present invention generally relates to aviation and more particularly relates to systems and methods for controlling a magnitude of a sonic boom caused by off-design-condition operation of a supersonic aircraft at supersonic speeds.

BACKGROUND

Supersonic aircraft are designed to operate at predetermined design conditions, such as a design-condition weight and a design-condition speed, to name just two. When the supersonic aircraft is operated at the design-conditions, the supersonic aircraft will have a corresponding shape (the "design shape"). The design shape will give rise to a corresponding volume and lift distributions along the supersonic aircraft. If the shape of the supersonic aircraft changes, so will the lift distribution.

The magnitude of the sonic boom (e.g., the perceived loudness at ground level caused by passage of the supersonic aircraft overhead at supersonic speeds) generated by the supersonic aircraft correlates strongly with the volume and lift distributions. By extension, the magnitude of the sonic boom also correlates with the shape of the supersonic aircraft. When designers calculate the magnitude of the sonic boom caused by the supersonic aircraft during supersonic flight, these calculations are based on the design shape.

During the flight of a supersonic aircraft, its shape will deviate from the design shape because its conditions will change. For instance, when the aircraft takes off, it may be carrying an amount of fuel that causes the supersonic aircraft to exceed its design-condition weight. During the flight, the supersonic aircraft may fly at supersonic speeds that are both above and below the design-condition speed. During the flight, the supersonic aircraft will consume fuel such that by the end of the flight, the supersonic aircraft may weigh less than its design-condition weight.

Exceeding the design-condition weight and/or design-condition speed can cause the wings of the supersonic aircraft to deflect upwards beyond a design-condition orientation. Similarly, operating the supersonic aircraft below the design-condition weight and/or speed can cause the wings to deflect downward beyond the design-condition orientation. Furthermore, the wings on a supersonic aircraft are typically swept back to reduce drag. When a swept wing deflects up or down, it causes the wing to twist because of the wing's restrained condition at the fuselage and its unrestrained condition at the wing tip. Wing twist increases in magnitude in the outboard direction and is most pronounced at the wing tip. As a swept wing deflects in an upward direction, the wing will twist in a nose-down direction. As a swept wing deflects in a downward direction, the wing will twist in a nose-up direction.

Changes in the shape of the supersonic aircraft, and in particular, changes in the amount of twist that a wing experiences will cause the lift distribution on the supersonic aircraft to vary from the desired lift distribution. This can negatively impact the magnitude of the sonic boom generated by the supersonic aircraft. It is desirable to control the magnitude of the sonic boom, and therefore it is desirable to control changes in the shape and lift distribution of the supersonic aircraft during the supersonic portions of its flight.

Accordingly, it is desirable to provide systems that can counteract the forces that cause the wings to twist and that cause the lift distribution along the supersonic aircraft to vary. In addition, it is desirable to provide methods to counteract wing twist and variations in the lift distribution. Furthermore, other desirable features and characteristics will become apparent from the subsequent summary and detailed description and the appended claims, taken in conjunction with the accompanying drawings and the foregoing technical field and background.

BRIEF SUMMARY

Methods and systems for controlling a magnitude of a sonic boom caused by off-design-condition operation of a supersonic aircraft at supersonic speeds are disclosed herein.

In a first non-limiting embodiment, the system includes, but is not limited to, a first sensor that is configured to detect a first condition of the supersonic aircraft. The system further includes, but is not limited to, a pair of wings that are configured to move fore and aft. The system still further includes, but is not limited to, a processor that is communicatively coupled with the sensor and that is operatively coupled with the pair of wings. The processor is configured to: (1) receive a first information from the first sensor, the first information indicative of the first condition of the supersonic aircraft, (2) calculate a lift distribution of the supersonic aircraft based, at least in part, on the first information, (3) determine an existence of a deviation of the lift distribution from a desired lift distribution based on the flight condition, and (4) control the pair of wings to move in a direction that redistributes the lift in a manner that more closely conforms to the desired lift distribution. The magnitude of the sonic boom is reduced when the deviation is reduced.

In another non-limiting embodiment, the method includes, but is not limited to, the step of sensing a first condition of the supersonic aircraft. The method further includes, but is not limited to the step of receiving, at a processor, a first information indicative of the first condition. The method further includes, but is not limited to the step of calculating, with the processor, a lift distribution of the supersonic aircraft based, at least in part, on the first information. The method still further includes, but is not limited to, determining, with the processor, an existence of a deviation of the lift distribution from a desired lift distribution. The method still further includes controlling a pair of wings configured to move fore and aft to move in a direction that redistributes the lift in a manner that more closely conforms to the desired lift distribution. The magnitude of the sonic boom is reduced when the deviation is reduced.

BRIEF DESCRIPTION OF THE DRAWINGS

The present invention will hereinafter be described in conjunction with the following drawing figures, wherein like numerals denote like elements.

DETAILED DESCRIPTION

Figure 1:
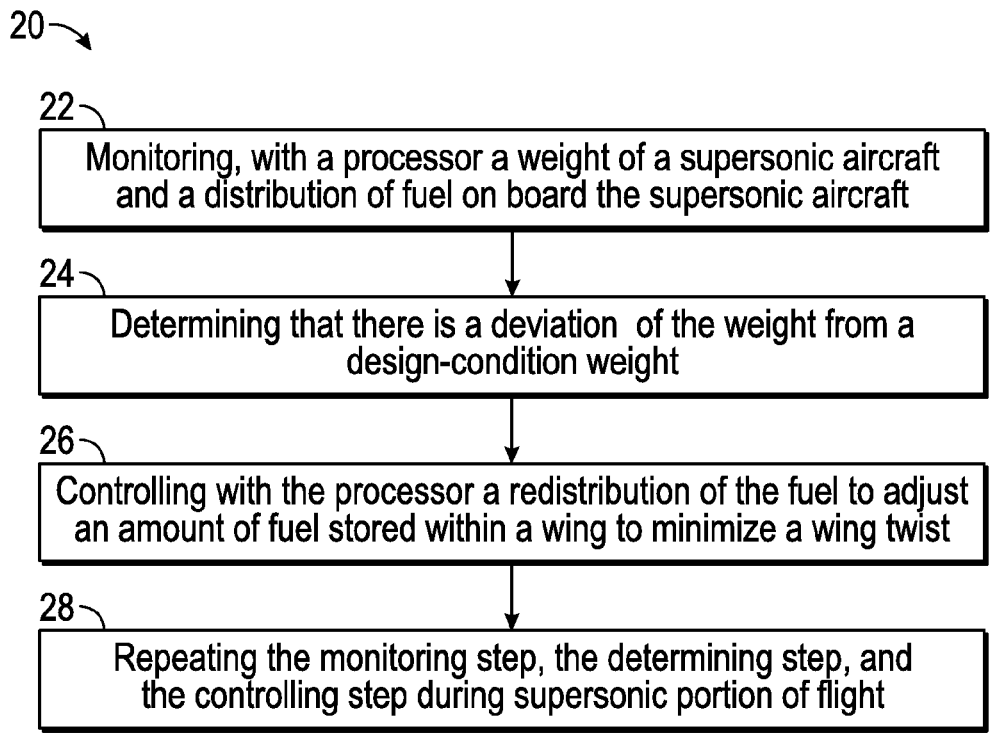
FIG. 1 is a flow diagram illustrating a non-limiting embodiment of a method for controlling a magnitude of a sonic boom caused by off-design-condition operation of a supersonic aircraft at supersonic speeds.

The following detailed description is merely exemplary in nature and is not intended to limit the invention or the application and uses of the invention. Furthermore, there is no intention to be bound by any theory presented in the preceding background or the following detailed description.

For simplicity and clarity of illustration, the drawing figures depict the general structure and/or manner of construction of the various embodiments. Descriptions and details of well-known features and techniques may be omitted to avoid unnecessarily obscuring other features. Elements in the drawings figures are not necessarily drawn to scale: the dimensions of some features may be exaggerated relative to other elements to assist/improve understanding of the example embodiments.

Terms of enumeration such as "first," "second," "third," and the like may be used for distinguishing between similar elements and not necessarily for describing a particular spatial or chronological order. These terms, so used, are interchangeable under appropriate circumstances. The embodiments of the invention described herein are, for example, capable of use in sequences other than those illustrated or otherwise described herein.

The terms "comprise," "include," "have" and any variations thereof are used synonymously to denote non-exclusive inclusion. The term "exemplary" is used in the sense of "example," rather than "ideal."

Various methods and systems are taught herein to control the magnitude of a sonic boom caused by off-design-condition operation of a supersonic aircraft at supersonic speeds. In one exemplary solution, methods and systems are taught for moving fuel into and out of the wings of the supersonic aircraft and for redistributing the fuel within the wings of the supersonic aircraft to counteract the forces causing the wing to deflect. In another exemplary solution, methods and systems are taught for moving the wings of the supersonic aircraft in a manner that improves the lift distribution on the supersonic aircraft when the conditions experienced by the supersonic aircraft cause the lift distribution to deviate from a desired lift distribution. In another exemplary solution, methods are taught for using composite plies to counteract the twisting that the wings of the supersonic aircraft will experience during off-design-condition operation. In yet another exemplary solution, methods and systems are taught that utilize control surfaces on the wing to introduce a torsion that counteracts the twisting caused by off-design-condition operation of the supersonic aircraft at supersonic speeds.

A greater understanding of the systems and methods described above may be obtained through a review of the illustrations accompanying this application together with a review of the detailed description that follows.

Fuel Management Solution

FIG. 1 is a flow diagram illustrating a non-limiting embodiment of a method 20 for controlling a magnitude of a sonic boom caused by off-design-condition operation of a supersonic aircraft at supersonic speeds. At step 22, a processor is used to monitor a weight of a supersonic aircraft. In some embodiments, the weight may be determined by a combination of known initial conditions of the aircraft, such as the unfueled weight of the supersonic aircraft, the weight of the cargo on board the supersonic aircraft, the weight of the passengers onboard the supersonic aircraft, and the weight of the fuel loaded onto the supersonic aircraft. Additional factors may also be considered. Throughout the flight of the supersonic aircraft, the engines will consume the fuel and the weight of the supersonic aircraft will correspondingly change. The processor will monitor this change throughout the supersonic portion of the flight.

At step 22, the processor will also monitor the distribution of fuel onboard the supersonic aircraft. The supersonic aircraft may have fuel tanks mounted in the wings, in the wing box (the structure where the port wing and the starboard wing are conjoined), in the vertical stabilizer, in the fuselage, and elsewhere. The various fuel tanks onboard the supersonic aircraft will be fluidly coupled to one another such that fuel in one tank may be moved to another tank using one or more fuel pumps. Each fuel tank may have a sensor associated with it that provides information to the processor indicative of the amount of fuel in each corresponding fuel tank.

In some embodiments, the processor will utilize the information provided by the sensors to monitor the amount of fuel in each fuel tank, to monitor the movement of fuel between fuel tanks, and to monitor the diminution in fuel in the various fuel tanks as the fuel is consumed. In some embodiments, the processor will calculate the weight of the supersonic aircraft based on the fuel distribution onboard the supersonic aircraft. In other embodiments, any suitable method for monitoring the weight of the supersonic aircraft and the distribution of fuel onboard the supersonic aircraft may be employed.

At step 24, the processor determines that there is a deviation of the weight of the supersonic aircraft from a design-condition weight. As used herein, the term "design-condition-weight" refers to the weight of the supersonic aircraft that was used by designers when calculating the sonic boom that the supersonic aircraft would generate when flying at a design-condition supersonic speed and altitude (e.g., cruise speed and altitude). For example, at takeoff, the supersonic aircraft may be fully loaded with fuel. Such fuel loading may cause the supersonic aircraft to greatly exceed the design-condition weight. The supersonic aircraft will remain above the design-condition weight until a sufficient amount of fuel has been consumed and the supersonic aircraft reaches the design-condition weight. As the supersonic aircraft continues to consume fuel, its weight will fall below the design-condition weight. Towards the end of the flight, the supersonic aircraft may have consumed the majority of its fuel, causing it to weigh well below the design condition weight. For all states other than where the supersonic aircraft is at its design-condition weight, the processor will determine that there is a deviation of the weight of the supersonic aircraft from the design-condition weight.

When the supersonic aircraft is at a weight other than the design-condition weight, the wings of the supersonic aircraft will experience deflection and twist. When the supersonic aircraft is above the design-condition weight, its wings will deflect up because of the added lift needed to support the supersonic aircraft in its overweight state. Such upward deflection will cause a nose-down twist of the wings, assuming the wings are swept back. When the supersonic aircraft weighs less than the design-condition weight, the wings will deflect down because there is less lift pulling in an upward direction on the wings. Such a downward deflection of the wings will cause a nose-up twist, assuming that the wings are swept back.

At step 26, the processor will be used to control a redistribution of the fuel onboard the supersonic aircraft to counteract the effects of the off-design condition. The redistribution of fuel onboard the supersonic aircraft will adjust the amount of fuel stored within a fuel tank mounted in a wing of the supersonic aircraft. If the supersonic aircraft is above its design-condition weight and the wings are deflected up and twisted nose-down, the processor will redistribute additional fuel to the fuel tank mounted in the wing from one or more fuel tanks located elsewhere onboard the supersonic aircraft to increase the weight of the wing. Increasing the weight of the wing offsets the upward deflection which, in turn, untwists the wing in a nose-up direction. Conversely, if the supersonic aircraft is below its design-condition weight and the wings are deflected down and twisted nose-up, the processor will redistribute additional fuel from the tank mounted in the wing to one or more fuel tanks located elsewhere onboard the supersonic aircraft to decrease the weight of the wing. Decreasing the weight of the wing offsets the downward deflection and untwists the wing in a nose-down direction.

In some embodiments, the processor may control such redistribution by sending appropriate instructions to fuel pumps on board the supersonic aircraft. The amount of fuel that the processor redistributes to and from the fuel tanks mounted in the wing may correspond with the magnitude of the deviation of the weight of the supersonic aircraft from the design-condition weight.

At step 28, steps 22 through 26 are repeated throughout the supersonic portion of the flight. In other words, the processor will repeatedly monitor the weight and fuel distribution onboard the supersonic aircraft. The processor will also repeatedly determine the existence and magnitude of a deviation of the weight of the supersonic aircraft from a design-condition weight. The processor will also repeatedly issue commands to the fuel pumps or other devices onboard the supersonic aircraft to redistribute fuel to and/or from the fuel tank mounted in the wing of the supersonic aircraft. Such repeated monitoring, determining, and controlling may occur periodically at predetermined intervals or they may occur substantially continuously throughout the supersonic portion of the flight, or they may occur repeatedly or substantially continuously throughout a portion of the supersonic portion of the flight, or at any other time as needed.

Figure 2:
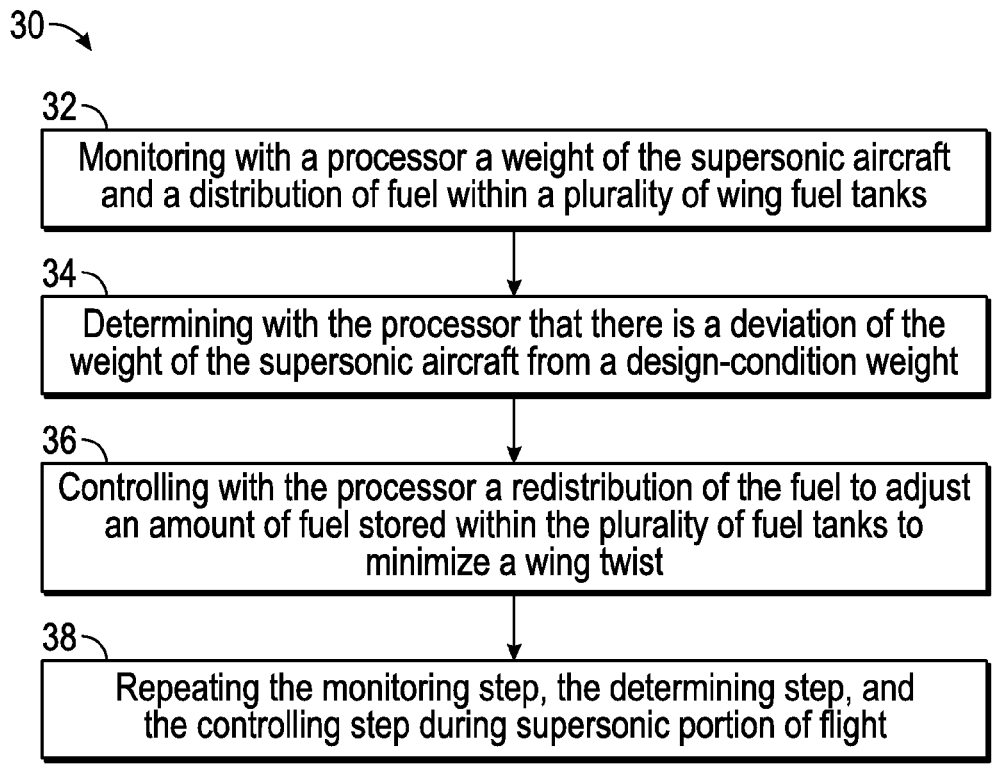
FIG. 2 is a flow diagram illustrating another non-limiting embodiment of a method for controlling a magnitude of a sonic boom caused by off-design-condition operation of a supersonic aircraft at supersonic speeds.

FIG. 2 is a flow diagram illustrating another non-limiting embodiment of a method 30 for controlling a magnitude of a sonic boom caused by off-design-condition operation of a supersonic aircraft at supersonic speeds. With continuing reference to FIG. 1, whereas method 20 related to redistributing fuel into and out of a wing of the supersonic aircraft, method 30 relates to redistributing fuel between multiple fuel tanks located within the wing of the supersonic aircraft.

At step 32, a processor is used to monitor a weight of a supersonic aircraft. As set forth above, the weight may be determined by a combination of known initial conditions of the aircraft, such as the unfueled weight of the supersonic aircraft, the weight of the cargo on board the supersonic aircraft, the weight of the passengers onboard the supersonic aircraft, and the weight of the fuel loaded onto the supersonic aircraft. Other factors may also be considered. Throughout the flight of the supersonic aircraft, the engines will consume the fuel and the weight of the supersonic aircraft will correspondingly change throughout the flight. The processor will monitor this change throughout the supersonic portion of the flight.

At step 33, the processor will also monitor the distribution of fuel located within multiple fuel tanks disposed within a wing of the supersonic aircraft. The multiple fuel tanks within the wing will be fluidly coupled to one another such that fuel in one tank may be moved to another tank using one or more fuel pumps. Each fuel tank may have a sensor associated with it that provides information to the processor indicative of the amount of fuel in each corresponding fuel tank.

In some embodiments, the processor will utilize the information provided by the sensors to monitor the amount of fuel in each fuel tank of the wing, to monitor the movement of fuel between fuel tanks in the wing, and to monitor the diminution in fuel in the various fuel tanks in the wing as the fuel is consumed. The processor may calculate the weight of the supersonic aircraft based on the fuel distribution within the multiple tanks in the wing as well as the fuel distribution within fuel tanks located elsewhere onboard the supersonic aircraft.

At step 34, the processor determines that there is a deviation of the weight of the supersonic aircraft from a design-condition weight. When the supersonic aircraft is at a weight other than the design-condition weight, the wings of the supersonic aircraft will experience deflection and twist. When the supersonic aircraft is above the design-condition weight, its wings will deflect up because of the added lift needed to support the heavy supersonic aircraft. Such upward deflection will cause a nose-down twisting of the wings (assuming that the wings are swept back). When the supersonic aircraft weighs less than the design-condition weight, the wings will deflect down because there is less lift pulling up on the wings. Such a downward deflection of the wings will cause a nose-up twisting of the wing (assuming that the wings are swept back).

At step 36, the processor will be used to control a redistribution of the fuel onboard the supersonic aircraft to counteract the effects of the off-design condition. The redistribution of fuel onboard the supersonic aircraft will adjust the amount of fuel stored within the multiple fuel tanks mounted in the wing of the supersonic aircraft.

In some embodiments, if the supersonic aircraft is above its design-condition weight and the wings are deflected up and twisted nose-down, the processor will redistribute additional fuel to the fuel tanks mounted in the wing from one or more fuel tanks located elsewhere onboard the supersonic aircraft to increase the overall weight of the wing. Increasing the weight of the wing will offset the upward deflection and will untwist the wing in a nose-up direction. When controlling such redistribution, the processor may add fuel to each of the multiple wing-mounted fuel tanks equally. Alternatively, the processor may redistribute the fuel so as to add fuel to only one or to only some of the wing-mounted fuel tanks. For example, the processor may control the fuel pumps so as to add fuel to only an outboard wing-mounted fuel tank(s) without adding any to an inboard mounted fuel tank(s).

In circumstances where the supersonic aircraft is lighter than the design-condition weight and the wings are deflected down and twisted nose-up, the fuel may be redistributed from the multiple wing-mounted fuel tanks to fuel tanks disposed elsewhere in the supersonic aircraft. This will lighten the wings and, in turn, offset the downward deflection and untwist the wings nose-down.

In other embodiments, if the supersonic aircraft is above its design-condition weight and the wings are deflected up and twisted nose-down, the processor will not add fuel to the wing-mounted fuel tanks, but rather, will redistribute the fuel that is stored within the multiple fuel tanks by moving fuel from one or more inboard wing-mounted fuel tank(s) to one or more outboard wing-mounted fuel tank(s). This redistribution of fuel will have the effect of redistributing the weight within the wing so that additional weight is supported by a more outboard portion of the wing and less weight is supported by a more inboard portion of the wing. This may be sufficient to offset the upward deflection and cause the wing to untwist in a nose-up direction.

Conversely, if the supersonic aircraft is below its design-condition weight and the wings are deflected down and twisted nose-up, the processor will redistribute the fuel from an outboard fuel tank(s) to an inboard fuel tank(s). Such redistribution will have the effect of redistributing the weight of the wing such that the outboard portion of the wing is lightened and the inboard portion of the wing will bear an increased portion of the load. Redistributing the fuel in this manner may be sufficient to offset the downward deflection of the wing and cause the wing to untwist in a nose-down direction.

The processor may control such redistribution by sending appropriate instructions to fuel pumps associated with the wing-mounted fuel tanks and/or sending appropriate instructions to fuel pumps associated with fuel tanks located elsewhere onboard the supersonic aircraft. In some embodiments, the amount of fuel that the processor redistributes may correspond with the magnitude of the deviation of the weight of the supersonic aircraft from the design-condition weight of the supersonic aircraft. For example, the greater the deviation of the weight of the supersonic aircraft from its design-condition weight, the more fuel that the processor may move to address the resulting deflection and twist.

At step 38, steps 32 through 36 are repeated throughout the supersonic portion of the flight. In other words, the processor will repeatedly monitor the weight and fuel distribution onboard the supersonic aircraft and within the fuel tanks mounted with the wing(s) of the supersonic aircraft. The processor will also repeatedly determine the existence and magnitude of a deviation of the weight of the supersonic aircraft from a design-condition weight. The processor will also repeatedly issue commands to the fuel pumps or other devices onboard the supersonic aircraft to redistribute fuel to and/or from the fuel tank(s) mounted in the wing of the supersonic aircraft. Such repeated monitoring, determining, and controlling may occur periodically at predetermined intervals or they may occur substantially continuously throughout the supersonic portion of the flight, or they may occur repeatedly or substantially continuously throughout a portion of the supersonic portion of the flight, or at any other time as needed.

Figure 3:
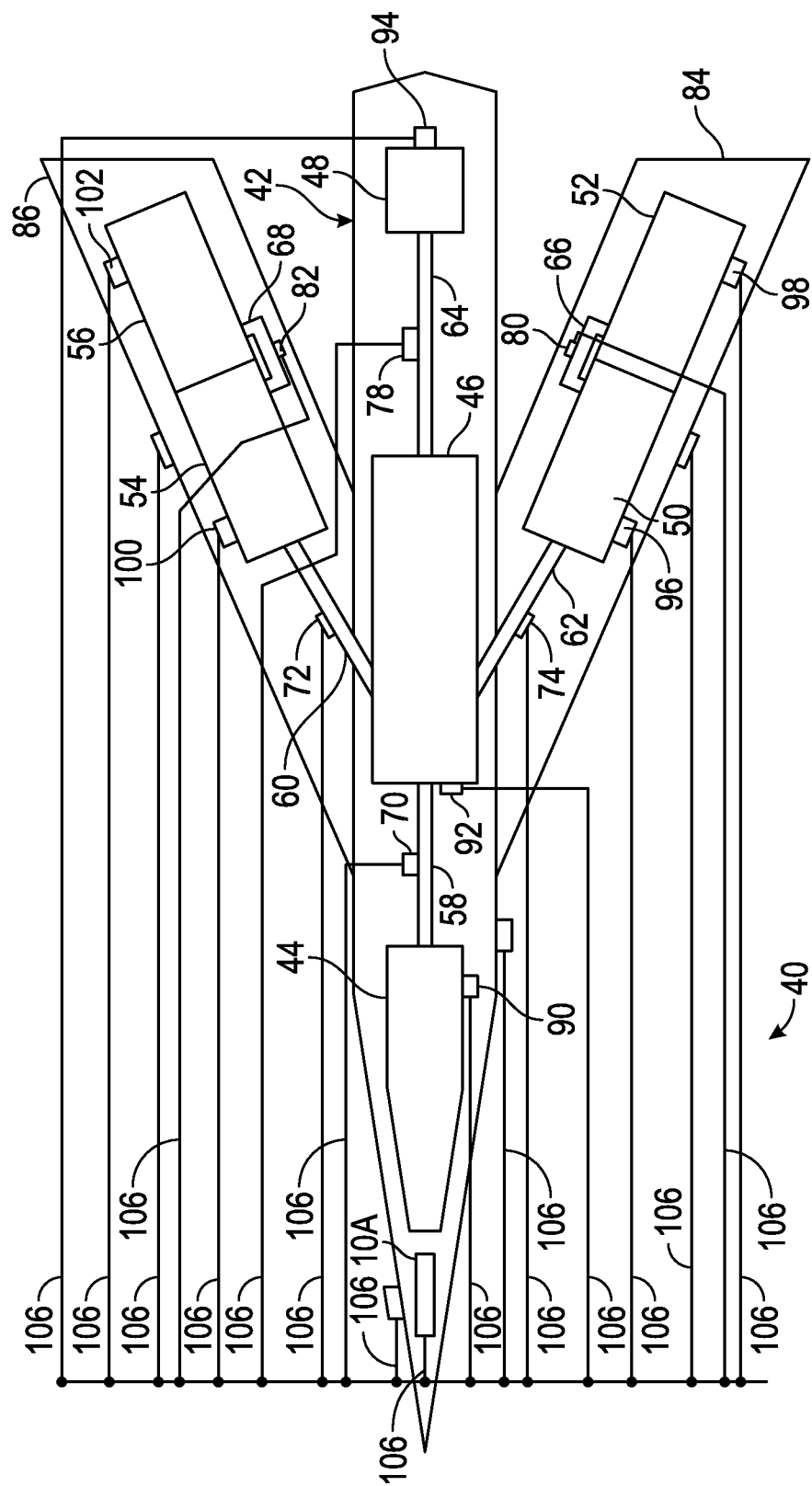
FIG. 3 is a schematic view illustrating a non-limiting embodiment of a system for controlling a magnitude of a sonic boom caused by off-design-condition operation of a supersonic aircraft at supersonic speeds.

FIG. 3 is a schematic view illustrating a non-limiting embodiment of a system 40 for controlling a magnitude of a sonic boom caused by off-design-condition operation of a supersonic aircraft 42 at supersonic speeds. System 40 includes fuel tanks 44, 46, 48, 50, 52, 54, and 56 (collectively referred to herein as "the fuel tanks"). In the illustrated embodiment, the fuel tanks are located throughout supersonic aircraft 42. The fuel tanks are fluidly coupled with one another via pipes 58, 60, 62, 64, 66, and 68 (collectively referred to herein as "the pipes"). The pipes are configured to permit fuel to move back and forth between the fuel tanks.

System 40 further includes fuel pumps 70, 72, 74, 76, 78, 80, and 82 (collectively referred to as the fuel pumps"). Each fuel pump is associated with a respective one of the pipes. The fuel pumps are configured to control the movement of fuel back and forth between the fuel tanks.

As illustrated, fuel tanks 50 and 52 are disposed in port wing 84 and fuel tanks 54 and 56 are disposed in starboard wing 86. Fuel tanks 52 and 56 are disposed in outboard positions within their respective wings and fuel tanks 50 and 54 are disposed in inboard positions within their respective wings. Although supersonic aircraft 42 includes two fuel tanks mounted within each wing, it should be understood that in other embodiments, a greater or lesser number of fuel tanks may be mounted within each wing without departing from the teachings of the present disclosure.

System 40 further includes fuel sensors 90, 92, 94, 96, 98, 100, and 102. Each fuel sensor is associated with a respective one of the fuel tanks and is configured to detect an amount of fuel present in each tank.

System 40 further includes a processor 104. Processor 104 may be any type of onboard computer, controller, micro-controller, circuitry, chipset, computer system, or microprocessor that is configured to perform algorithms, to execute software applications, to execute sub-routines and/or to be loaded with and to execute any other type of computer program. Processor 104 may comprise a single processor or a plurality of processors acting in concert. In some embodiments, processor 104 may be dedicated for use exclusively with system 40 while in other embodiments processor 104 may be shared with other systems onboard supersonic aircraft 42.

Processor 104 is communicatively coupled with the fuel sensors and is operatively coupled with the fuel pumps via wires 106. It should be understood that in other embodiments, the coupling could alternatively be accomplished be via fiber optics or via any suitable wireless technology without departing from the teachings of the present disclosure. For ease of illustration, wires 106 have been illustrated as extending outside of supersonic aircraft 42. It should be understood that wires 106 would actually be contained internally within supersonic aircraft 42. Furthermore, while the communicative and operative couplings between processor 104 and the fuel pumps and the fuel sensors have been illustrated as being via physical wires, it should be understood that such couplings may be achieved through the use of any suitable means of transmission including both wired and/or wireless connections. For example, wires such as wire 106 may be employed in some embodiments while in other embodiments, each component may be wirelessly connected to processor 104 via a Bluetooth connection, a Wi-Fi connection or the like. In still other embodiments, the various components may be coupled by any suitable combination of wired and wireless means.

Being communicatively and/or operatively coupled provides a pathway for the transmission of commands, instructions, interrogations and other signals between processor 104 on the one hand and the fuel sensors and the fuel pumps on the other hand. Through this communicative/operative coupling, processor 104 may communicate with the fuel sensors and may control the fuel pumps. Furthermore, the fuel sensors and the fuel pumps are each configured to interface and engage with processor 104. For example, the fuel sensors are configured to provide information concerning the presence, the amount, and possibly other information concerning the fuel stored within its associated fuel tank. The fuel pumps are configured to receive instructions and commands from processor 104 and to comply with such instructions/commands by moving fuel between the fuel tanks.

Processor 104 is configured to interact with, coordinate and/or orchestrate the activities of each of the other components of system 40 for the purpose of reducing the magnitude of the sonic boom generated by supersonic aircraft 42 as it flies at supersonic speeds at off-design conditions. Processor 104 is configured to receive information from each of the fuel sensors indicative of the amount of fuel stored in a respective fuel tank. When each fuel sensor has provided this information, processor 104 can determine the current state of fuel distribution onboard supersonic aircraft 42. With this information, processor 104 can calculate the weight of supersonic aircraft 42. In some embodiments, processor 104 will receive this information and make these calculations periodically or continuously throughout the supersonic portion of the flight of supersonic aircraft 42.

Once processor 104 has calculated the weight of supersonic aircraft 42, processor 104 can compare that weight with a design-condition weight. Processor 104 is configured to determine the existence of a deviation of the weight of supersonic aircraft from the design condition weight and may further be configured to determine the magnitude of such deviation. When processor 104 determines the existence of such deviation, processor 104 is configured to send commands to the fuel pumps to redistribute a portion of the fuel onboard supersonic aircraft 42 to change the amount of fuel in port wing 84 and starboard wing 86. In some embodiments, processor 104 may send such commands continuously or periodically throughout the supersonic portion of the flight.

Depending on the magnitude of the deviation and the distribution of the fuel around supersonic aircraft 42, processor 104 may move fuel from tanks 44, 46, and/or 48 into fuel tanks 50, 52, 54, and 56 in order to lighten up or weigh down port wing 84 and starboard wing 86. In other instances, processor 104 may not move fuel from tanks 44, 46, and 48, but rather, will move fuel between fuel tanks 50 and 52 and between fuel tanks 54 and 56 in order to make either the inboard or the outboard portions of port wing 84 and the inboard or the outboard portions of starboard wing 86 heavier or lighter, as needed.

In some embodiments, the amount of fuel that is redistributed will correspond with the extent of the deviation of the weight of supersonic aircraft 42 from its design-condition weight. The greater the deviation, the more fuel that may need to be moved. The extent of the deviation may also be taken into consideration by processor 104 when deciding whether to move fuel from outside of the wings into the wings or whether to merely move fuel between the different tanks mounted within each wing. In some instances, processor 104 may give commands that both redistributed fuel to/from the wings and also move fuel between fuel tanks mounted within the wings.

Movement of fuel in the manner detailed above by system 40 will help to combat deflection of port wing 84 and starboard wing 86 and may be employed to maintain port wing 84 and starboard wing 86 at a desired orientation. This, in turn, may counteract the nose-up or nose-down twisting that the wings may otherwise experience and avoid an undesirable redistribution of the lift along supersonic aircraft 42. As a consequence, the magnitude of the sonic boom generated by supersonic aircraft 42 may be constrained within acceptable levels.

Variable Geometry Solution

Figure 4:
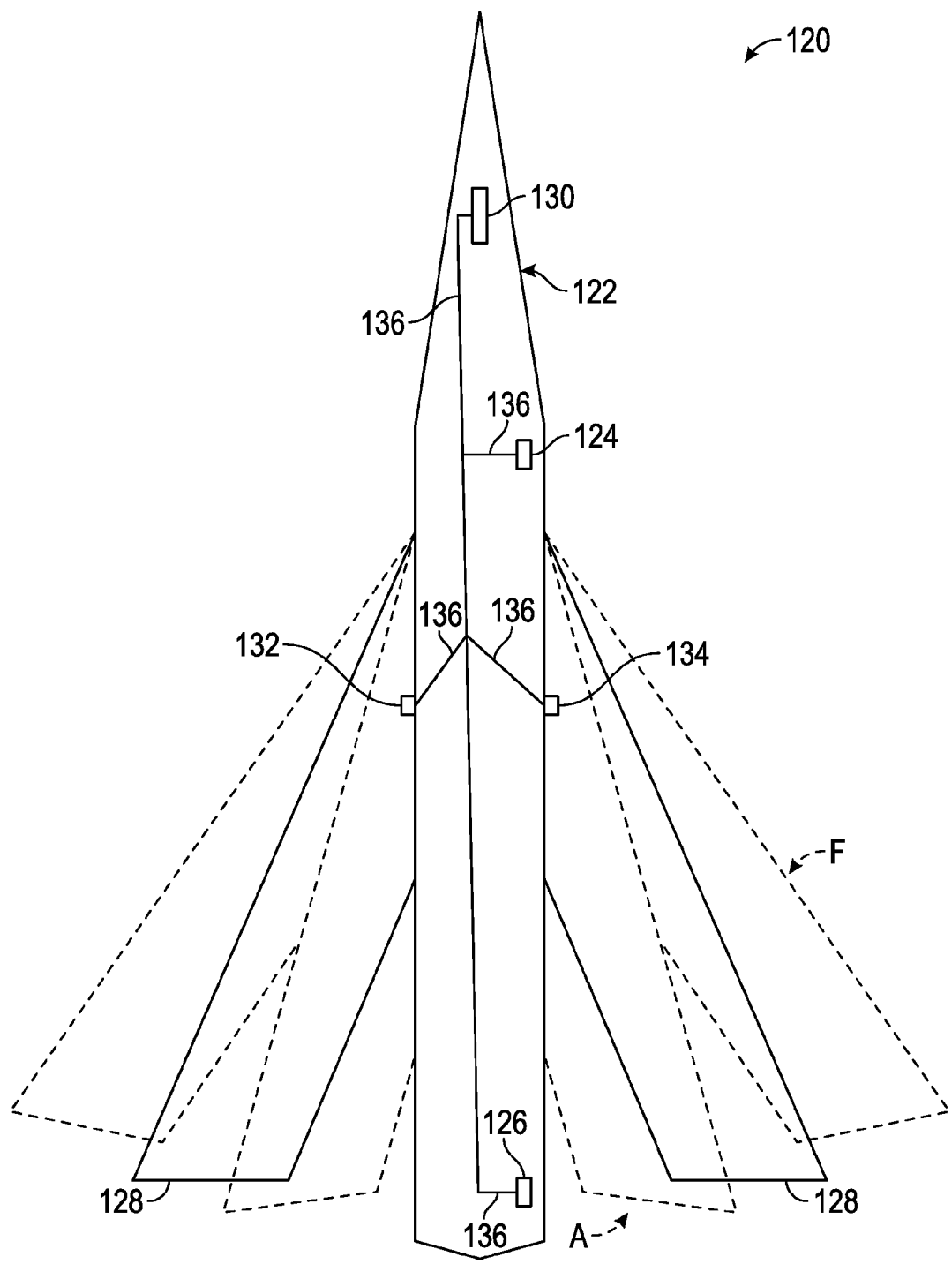
FIG. 4 is a schematic view illustrating another non-limiting embodiment of a system for controlling a magnitude of a sonic boom caused by off-design-condition operation of a supersonic aircraft at supersonic speeds.

FIG. 4 is a schematic view illustrating a non-limiting embodiment of a system 120 for controlling a magnitude of a sonic boom caused by off-design-condition operation of a supersonic aircraft 122 at supersonic speeds. System 120 includes a velocity sensor 124, a weight sensor 126, a pair of wings 128 configured for variable geometry, and a processor 130.

Velocity sensor 124 may comprise any suitable sensor capable of measuring the velocity of supersonic aircraft 122 including, but not limited to, aerodynamically compensated pitot-static tubes. Velocity sensor 124 is configured to sense the velocity of supersonic aircraft 122 and to generate information indicative of the velocity and is configured to provide such information to processor 130.

Weight sensor 126 may comprise any suitable sensor capable of measuring the weight of supersonic aircraft 122. In some examples, weight sensor 126 may comprise a fuel sensor capable of measuring an amount of fuel onboard supersonic aircraft 122 (from which the weight of supersonic aircraft 122 may be determined). Weight sensor 126 is further configured to generate information indicative of the weight of the supersonic aircraft 122 and to provide such information to processor 130.

Many of the surfaces of supersonic aircraft 122 generate lift, not only wings 128. Each surface contributes to the overall lift supporting supersonic aircraft, with some surfaces contributing greater amounts of lift and others contributing less. For example, wings 128 may contribute the largest amount of lift while a forward portion of the fuselage will contribute substantially less lift. When all of the various surfaces of supersonic aircraft 122 are taken into consideration, a lift distribution for supersonic aircraft 122 can be determined. Techniques for calculating a lift distribution along the surface of an aircraft is well known in the art. Such calculations may be based on information such as, but not limited to, the weight and the velocity (e.g. Mach number, calibrated, and/or equivalent airspeed to name a few) of an aircraft. The impact of weight on an aircraft's lift distribution is known. The heavier the aircraft is, the further forward its lift distribution will be biased (e.g., due to nose down twist of the wings relative to the design point) and the lighter the aircraft is, the further back its lift distribution will be biased (e.g., due to nose up twist of the wings relative to the design point). The impact of Mach and equivalent airspeed on an aircraft's lift distribution are known. A subset of Mach number and equivalent airspeed combinations will bias the lift distribution forward due to nose down twist of the wings relative to the design shape. The remainder of Mach number and equivalent airspeed combinations will bias the lift distribution aft due to nose up twist of the wings relative to the design shape.

Pair of wings 128 are configured to move between a forward swept position illustrated in phantom lines designated with the letter "F" and an aft swept position illustrated in phantom lines designated with the letter "A". Variable geometry wings are known in the art and provide supersonic aircraft 122 with various well known advantages, such as the ability to generate greater amounts of lift during takeoff and landing when pair of wings 128 are disposed in the forward swept position and the ability to generate lesser amounts of drag while flying at higher speeds while pair of wings 128 are disposed in the aft swept position. Because wings 128 generate the largest amount of lift, changing the position of wings 128 can impact the lift distribution along supersonic aircraft 122.

Movement of pair of wings 128 between their forward and aft swept positions are controlled by actuators 132 and 134. In other embodiments, any other mechanism suitable to move wings 128 between their forward and aft positions may be employed.

Velocity sensor 124 and weight sensor 126 and actuators 132 and 134 are coupled with processor 130 via wires 136. Processor 130 is communicatively coupled with velocity sensor 124 and weight sensor 126 and is operatively coupled with actuators 132 and 134 via wires 136. Processor 130 is configured to receive information from velocity sensor 124 and weight sensor 126 indicative of the velocity and weight of supersonic aircraft 122, respectively. Processor 130 is further configured to use this information, as well as information received from other sources and/or sensors, to calculate a lift distribution along supersonic aircraft 122. Processor 130 is further configured to determine when the lift distribution along supersonic aircraft 122 deviates from a desired lift distribution. Processor 130 may be further configured to determine the magnitude of such deviation.

Figure 5:
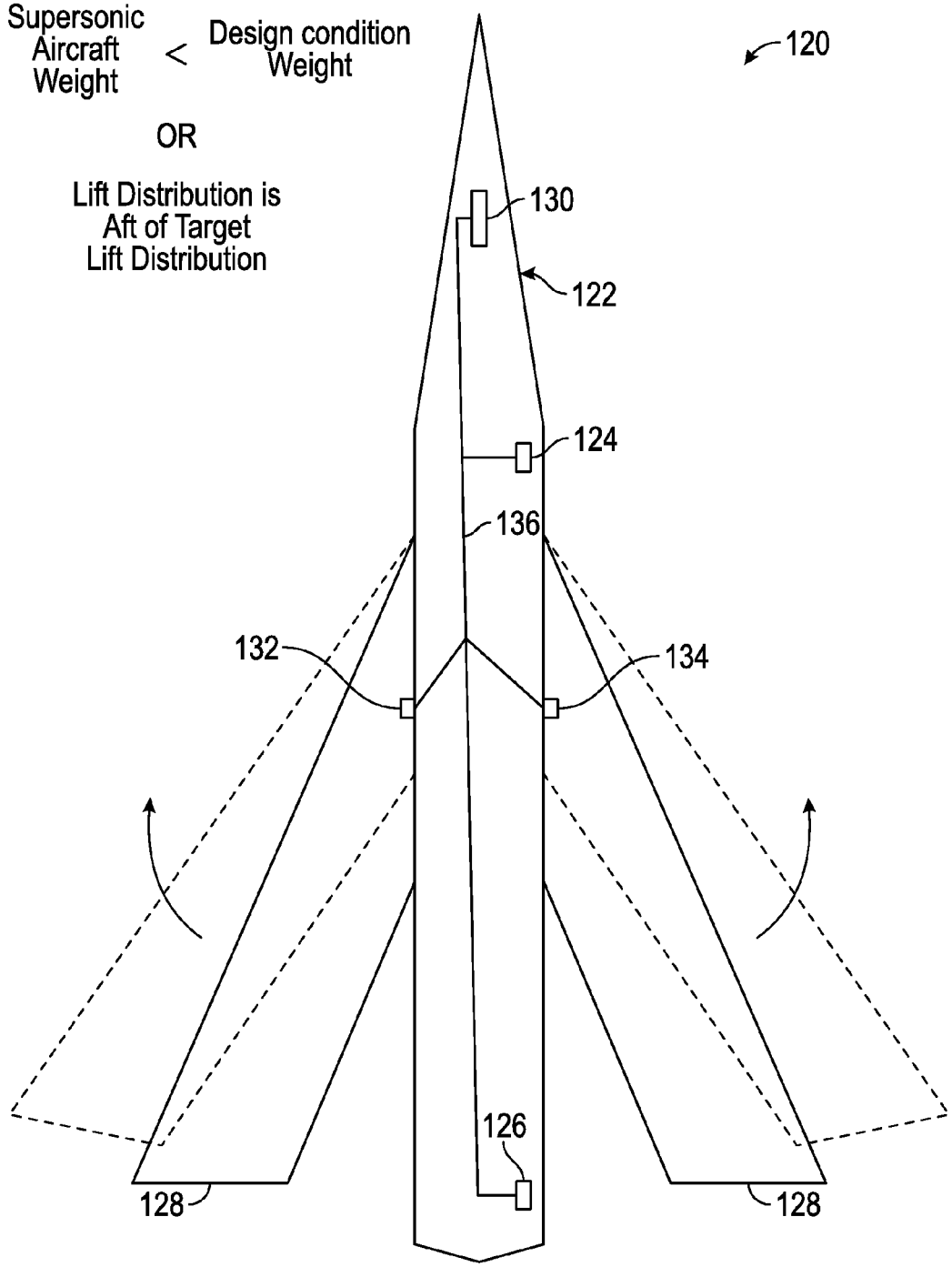
FIG. 5 is a schematic view illustrating the system of FIG. 4 operating to reduce the magnitude of the sonic boom caused by an under design-weight condition and/or an over design-condition speed condition.

With reference to FIG. 5, when processor 130 determines that the lift distribution deviates from the desired distribution, processor 130 is configured to take corrective action. For example, if the weight or velocity (or both) of supersonic aircraft 122 has caused the lift distribution to shift towards the rear of supersonic aircraft 122, processor 130 is configured to send commands to actuators 132 and 134 that will control wings 128 to move towards its forward position (illustrated in phantom lines). Forward movement of wings 128 will shift the lift distribution along supersonic aircraft 122 in the forward direction and will reduce the deviation between the desired lift distribution and the calculated lift distribution. In some embodiments, the extent to which wings 128 are swept forward will correspond to the extent of the deviation of the lift distribution from the desired lift distribution.

Figure 6:
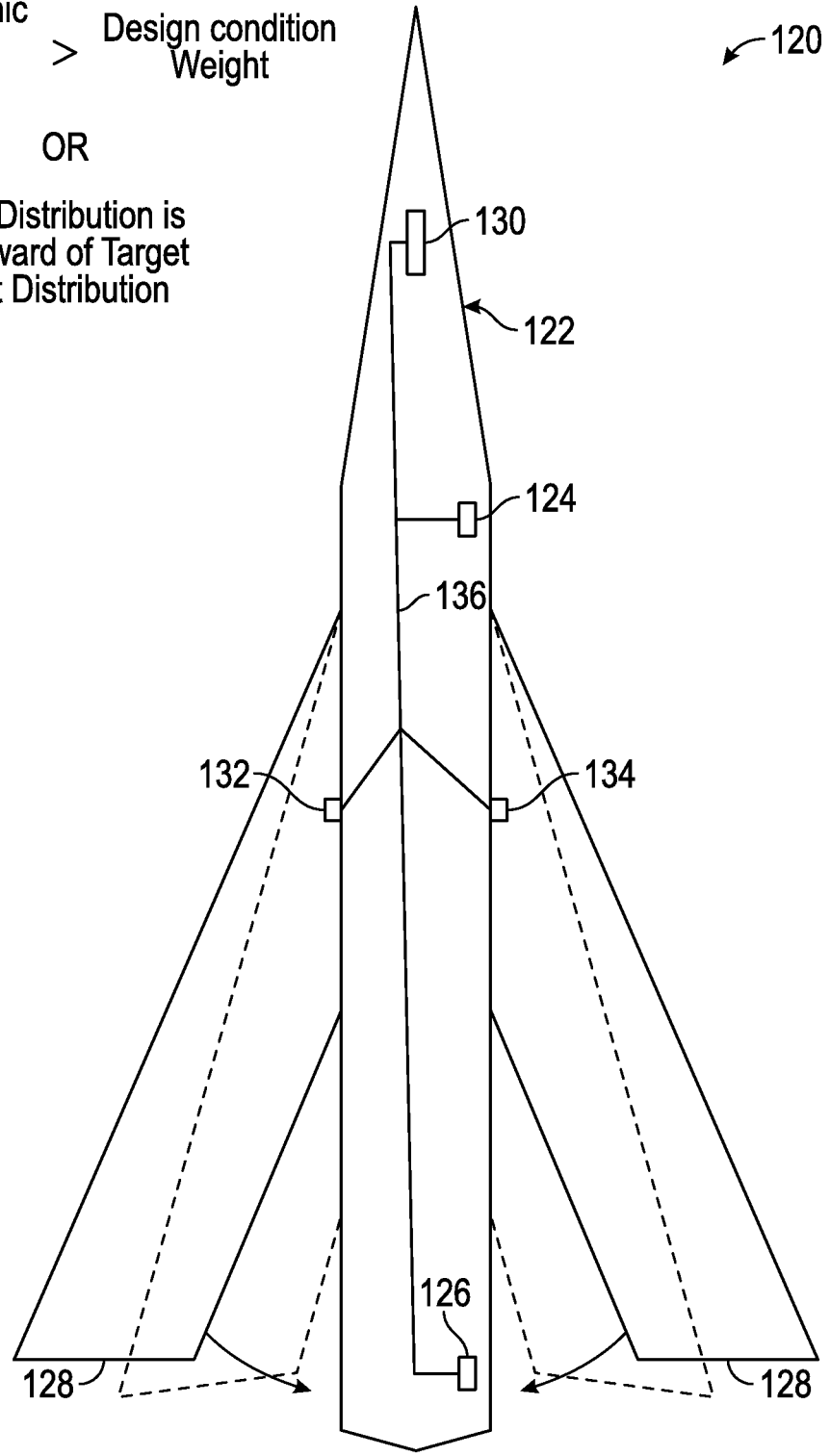
FIG. 6 is a schematic view illustrating the system of FIG. 4 operating to reduce the magnitude of the sonic boom caused by an over design-weight condition and/or an under design speed condition.

FIG. 6 illustrates the converse of what is shown in FIG. 5. In FIG. 6, processor 130 has determined, based on the information provided by velocity sensor 124 and weight sensor 126, that the lift distribution has shifted forward and now deviates from a desired lift distribution. To reduce this deviation, processor 130 sends commands to actuators 132 and 134 that cause wings 128 to sweep in an aft direction (illustrated in phantom lines). Aft movement of wings 128 will shift the lift distribution along supersonic aircraft 122 in the aft direction and will therefore reduce the deviation. In some embodiments, the extent to which wings 128 are swept aft will correspond to the extent of the deviation of the lift distribution from the desired lift distribution.

By taking corrective action and sweeping wings 128 in a direction that reduces the deviation of the lift distribution from a desired lift distribution, system 120 contributes to maintaining a desirable lift distribution along supersonic aircraft 122. This, in turn, helps to maintain the sonic boom generated by supersonic aircraft 122 at a desirable level. In some embodiments, system 120 may be configured to periodically or continuously detect the weight and velocity of supersonic aircraft 122, calculate the lift distribution along supersonic aircraft 122, determine the existence of a deviation between a desired and a current lift distribution, and sweep wings 128 in a manner that shifts the lift distribution to reduce or eliminate the deviation. Such continuous monitoring and correction may continue throughout the supersonic portion of the flight of supersonic aircraft 122, throughout a portion of the supersonic portion of the flight, or as desired.

Figure 7:
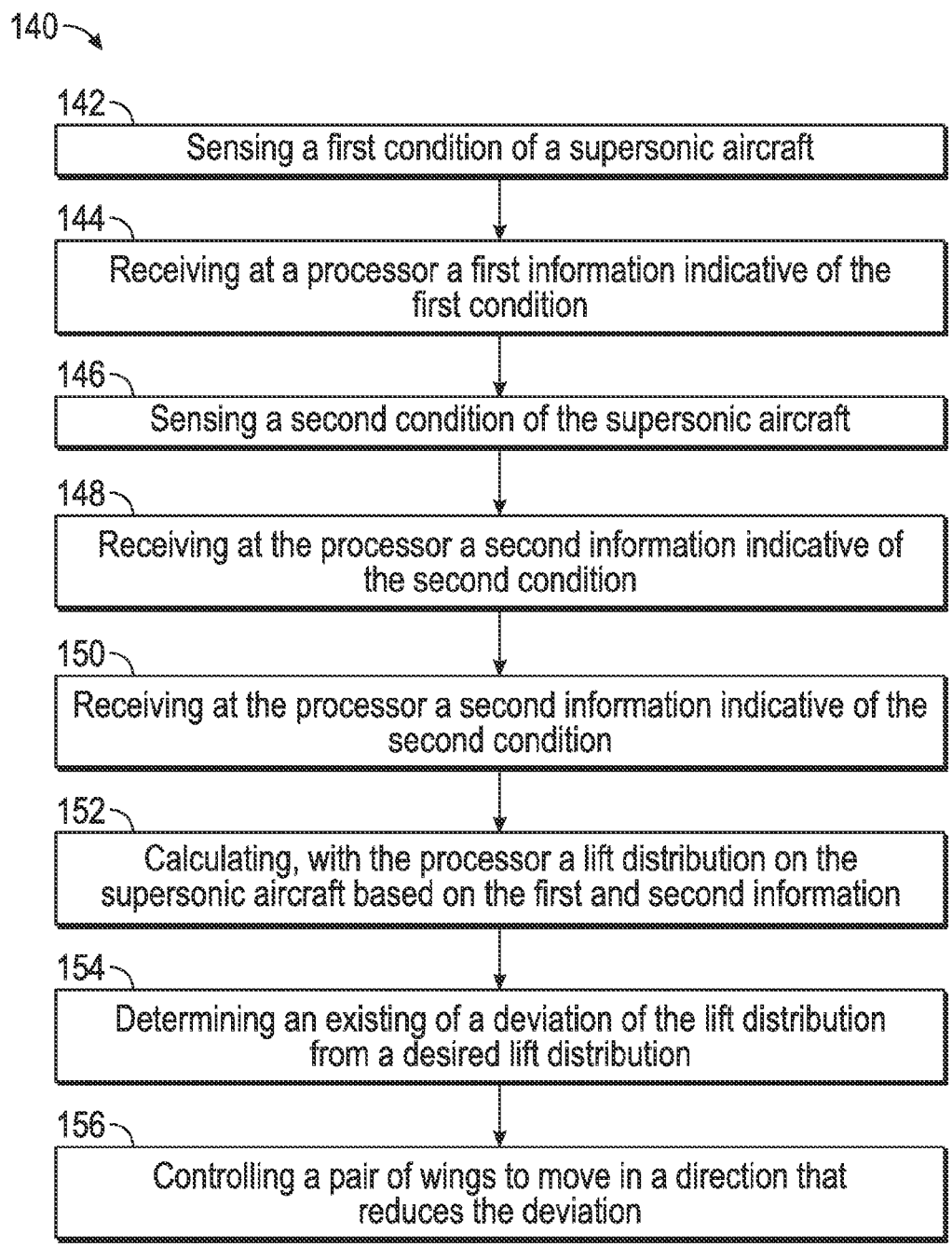
FIG. 7 is a flow diagram illustrating another non-limiting embodiment of a method for controlling a magnitude of a sonic boom caused by off-design-condition operation of a supersonic aircraft at supersonic speeds.

With respect to FIG. 7, a non-limiting embodiment of a method 140 for controlling the magnitude of a sonic boom caused by off-design-condition operation of a supersonic aircraft at supersonic speeds is illustrated.

At step 142, a first condition of a supersonic aircraft is sensed. In some embodiments, the first condition may be a weight of the supersonic aircraft. The weight of the supersonic aircraft may be sensed by sensing the amount of fuel onboard the supersonic aircraft.

At step 144, a first information indicative of the first condition is received at a processor. For example, the processor may receive a signal from the fuel sensor containing information indicative of the amount of fuel onboard the supersonic aircraft.

At step 146, a second condition of a supersonic aircraft is sensed. In some embodiments, the second condition may be a velocity of the supersonic aircraft. The velocity of the supersonic aircraft may be determined by sensing the stagnation pressure and the static pressure of the supersonic aircraft. This may be accomplished through the use of aerodynamically corrected pitot-static tubes.

At step 148, a second information indicative of the second condition is received at a processor. For example, the processor may receive a signal from a stagnation pressure sensor or a static pressure sensor (or both) containing information indicative of the stagnation pressure and the static pressure of the supersonic aircraft.

At step 152, the processor calculates the lift distribution along the supersonic aircraft based, at least in part, on the first information and the second information. Information from other sources onboard the supersonic aircraft may also be taken into account when making this calculation.

At step 154, the processor determines that there is a deviation between the lift distribution calculated in step 152 and a desired lift distribution (which may be a predetermined value accessible to the processor).

At step 156, the processor sends a command to variable geometry wings (e.g., wings configured to move both fore and aft) causing the variable geometry wings to move in a direction that redistributes the lift in a manner that move closely conforms to the desired lift distribution. For example, if the lift distribution has shifted towards the rear of the supersonic aircraft, the processor will control the wings in a manner that causes the wings to sweep in a forward direction. Sweeping the wings in a forward direction will shift the lift distribution forward and will counteract the effects of the off-design-condition weight or velocity. Conversely, if the lift distribution has shifted towards the front of the supersonic aircraft, the processor will control the wings in a manner that causes the wings to sweep in an aft direction. Sweeping the wings in an aft direction will shift the lift distribution aftward and will counteract the effects of the off-design-condition weight or velocity. In this manner, method 140 can be used to minimize any negative impact on sonic boom caused by operation of the supersonic aircraft at off-design conditions. It should be understood that in some embodiments, method 140 may be performed by sensing only a single condition (e.g., weight or speed) of the supersonic aircraft rather than two conditions as discussed here.

Composite Layup Solution

Figure 8:
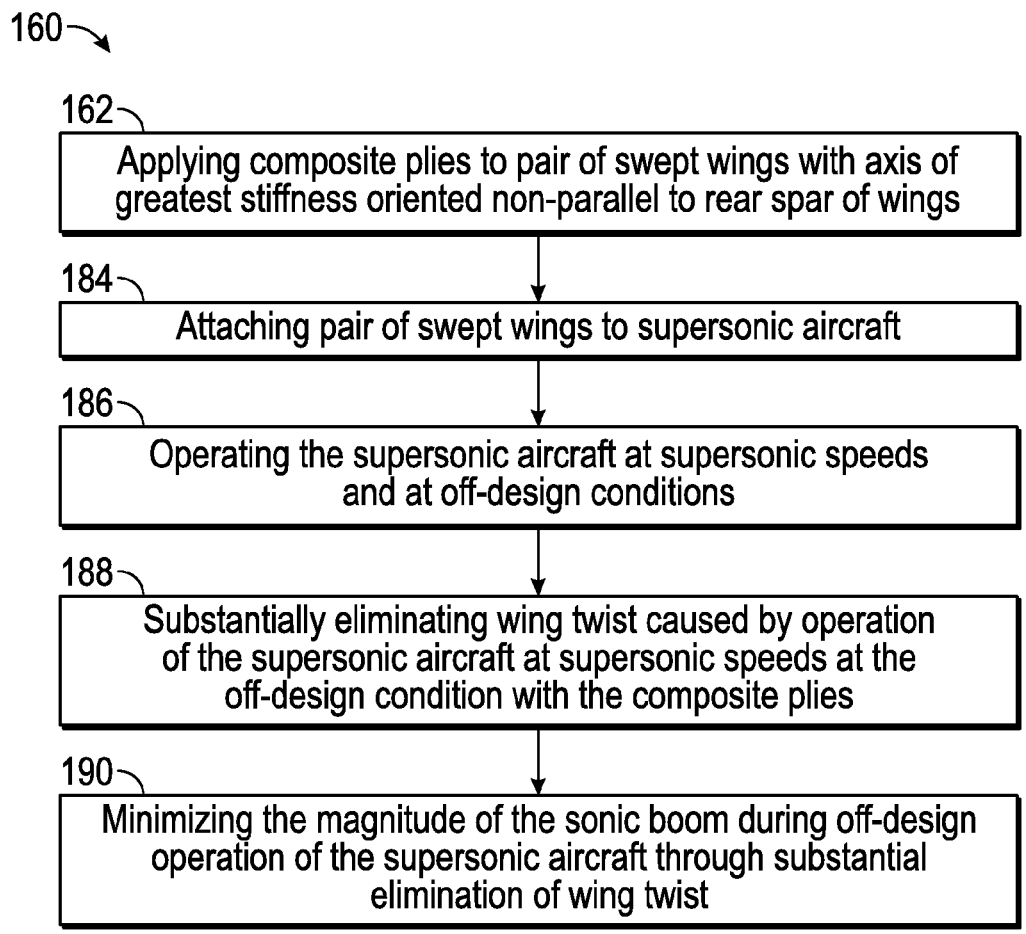
FIG. 8 is a flow diagram illustrating another non-limiting embodiment of a method for controlling a magnitude of a sonic boom caused by off-design-condition operation of a supersonic aircraft at supersonic speeds.

FIG. 8 is a flow diagram illustrating another non-limiting embodiment of a method 160 for controlling a magnitude of a sonic boom caused by off-design-condition operation of a supersonic aircraft at supersonic speeds. Whereas the preceding two solutions (the fuel management solution and the variable geometry solution) had taken an active approach to mitigating the consequences of off-design-condition operation of a supersonic aircraft at supersonic speeds, the composite layup solution discussed here offers a passive approach that helps to prevent some of the shape changing of the supersonic aircraft that leads to an increase in the magnitude of the sonic boom.

At step 162, composite plies are applied to a pair of swept wings. As is known in the art, the composite plies will have an axis of greatest stiffness. This is the axis along which the composite material, once set up and cured, will offer the greatest resistance to bending forces. When applied to conventional aircraft, the composite plies are oriented so that the axis of greatest stiffness is parallel to the rear spar of the wing. In contrast to this conventional approach, at step 162, the composite plies are applied to the pair of swept wings so that they are oriented to have a non-parallel angle with respect to the rear spar of each wing.

Figure 9:
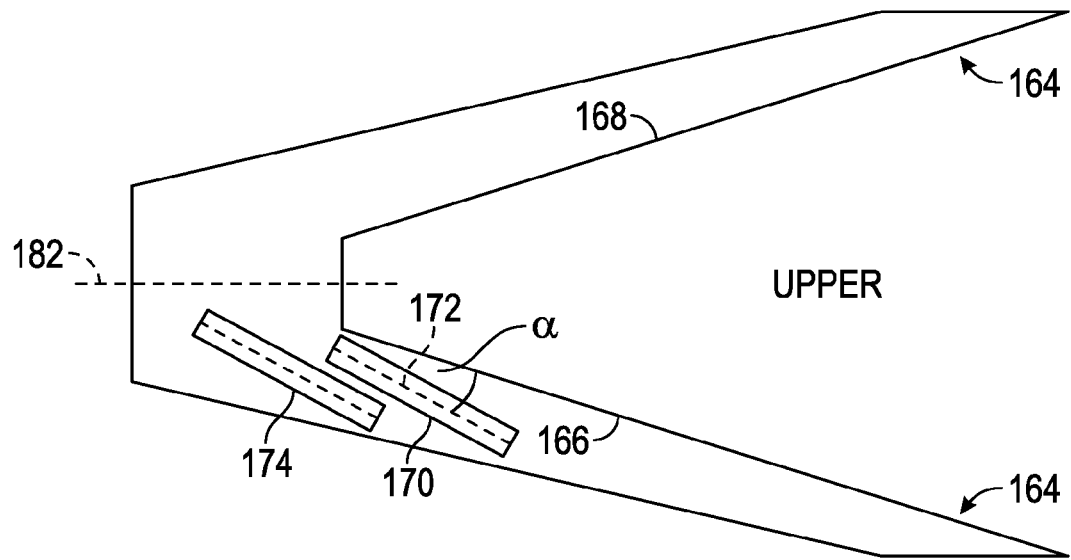
FIGS. 9-10 are schematic views illustrating an arrangement of composite plies on both a top side and an underside of a pair of wings configured for attachment to a supersonic aircraft.
Figure 10:
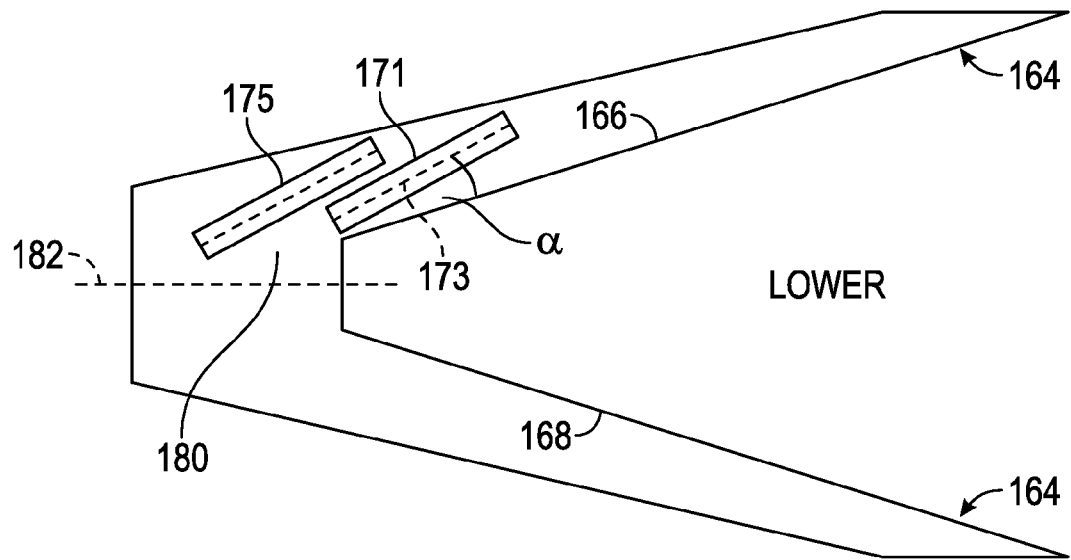

This is illustrated in FIGS. 9 and 10. FIG. 9 shows a pair of swept wings 164 from above such that an upper surface of swept wings 164 is visible. FIG. 10 shows pair of swept wings 164 from below such that a lower surface of swept wings 164 is visible. As illustrated in FIGS. 9 and 10, pair of swept wings 164 includes a rear spar 166 and a rear spar 168 running along a rear portion of each wing of pair of swept wings 164. Exemplary composite plies 170 and 171 are illustrated, composite ply 170 being disposed on an upper surface of pair of swept wings 164 and composite ply 171 being disposed on a lower surface of pair of swept wings 164. Composite ply 170 has an axis 172 of greatest stiffness illustrated in phantom lines and composite ply 171 has an axis 173 of greatest stiffness, also illustrated in phantom lines. Composite plies 170 and 171 are arranged on both the upper surface and the lower surface of pair of swept wings 164 such that there is a non-parallel angle α between axes 172, 173 and rear spar 166. In some embodiments, angle α may vary between plus and minus ninety degrees. In other embodiments, angle α may vary between ten and thirty degrees. In other embodiments, angle α may be approximately twenty degrees. Other angles and other ranges of angles may also be employed without departing from the teachings of the present disclosure.

When a composite ply's axis of greatest stiffness is aligned to be parallel with a wing's rear spar, that composite ply, when cured, will offer its greatest resistance to the bending moment applied to the wing while the aircraft is in flight. When the axis of greatest stiffness is aligned to have a non-parallel angle with respect to the wing's rear spar, the composite material will offer an increased level of resistance to twist as the wing deflects. In some examples, the composite plies applied to the surface of pair of swept wings 164 will enable pair of swept wings 164 to substantially or entirely resist twisting as the pair of wings deflect.

Also illustrated in FIGS. 9 and 10 are composite plies 174 and 175. As illustrated, in some embodiments, when composite plies are positioned on the wings of an aircraft, their pattern of placement (e.g., their orientation with respect to the rear spar) may continue onto the wing box. In this embodiment, composite plies 174 and 175 have been positioned directly onto wing box 180. A line 182 has been illustrated with phantom lines to depict a center point of wing box 180. The pattern of placement of the composite plies illustrated with composite plies 170, 171, 174, and 175 will continue along the wing until line 182 is reached. At that point, the orientation is reversed and the composite plies will be placed on the other wing and the other half of wing box 180 so as to have an angle α with respect to rear spar 168.

With continued reference to FIGS. 8-10, once a desired amount of composite plies have been placed onto pair of swept wings 164, at step 184, pair of swept wings 164 is attached to a supersonic aircraft. This may be accomplished in any suitable manner.

At step 186, the supersonic aircraft is operated at supersonic speeds and at off-design conditions. For example, the supersonic aircraft may be above or below its design-condition weight or may be flown above or below its design-condition velocity, or any other design-condition may be varied.

At step 188, the wing twist that would ordinarily occur as a result of operating the supersonic aircraft at supersonic speeds at off-design conditions is substantially eliminated through the resistance offered by the composite plies.

At step 190, the magnitude of the sonic boom caused by operation of the supersonic aircraft at supersonic speeds at off-design conditions is minimized. Such minimization occurs as a result of the substantial elimination of the wing twist.

Control Surface Manipulation

Figure 11:
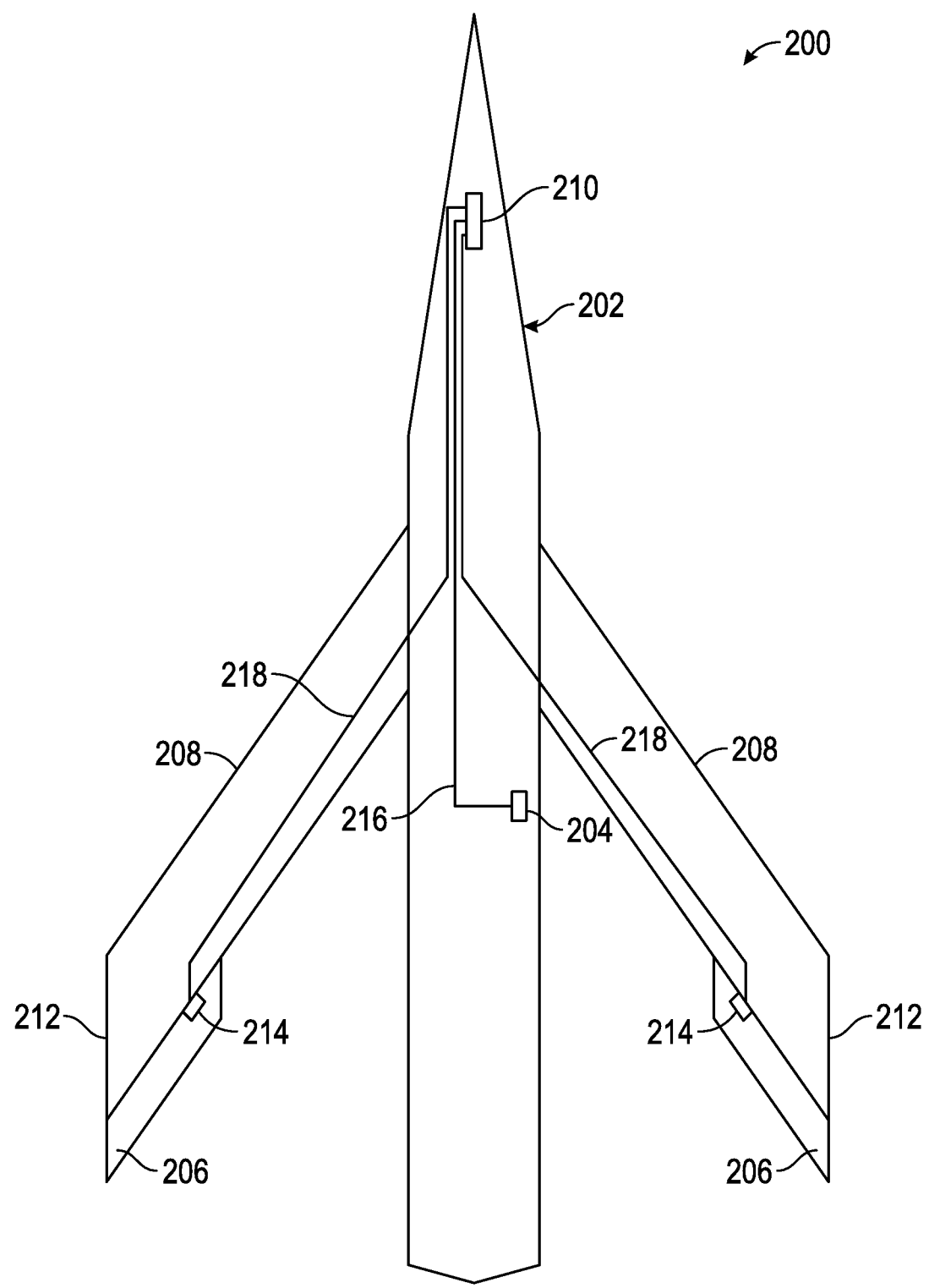
FIG. 11 is a schematic view illustrating another non-limiting embodiment of a system for controlling a magnitude of a sonic boom caused by off-design-condition operation of a supersonic aircraft at supersonic speeds.

FIG. 11 is a schematic view illustrating another non-limiting embodiment of a system 200 for controlling a magnitude of a sonic boom caused by off-design-condition operation of a supersonic aircraft 202 at supersonic speeds. System 200 includes a sensor 204 configured to detect a condition of supersonic aircraft 202. System 200 further includes a control surface 206 mounted to a wing 208. System 200 still further includes a processor 210.

Sensor 204 may be configured to detect a weight of supersonic aircraft 202, a velocity of supersonic aircraft 202, or any other condition that may cause a wing tip 212 of wing 208 to twist while supersonic aircraft 202 is moving at supersonic speeds. Control surface 206 may be any wing mounted control surface that is capable of exerting a torsion force on wing 208. In some embodiments, control surface 206 may be mounted to a leading edge of wing 208, while in other embodiments, control surface 206 may be mounted to a trailing edge of wing 208. In the illustrated embodiment, control surface 206 comprises a trailing edge mounted aileron. An actuator 214 is associated with control surface 206 and is configured to move control surface up and down in response to appropriate instructions.

Processor 210 is communicatively coupled with sensor 204 via wire 216 and is operatively coupled with actuator 214 via wire 218. Processor 210 is configured to receive information from sensor 204 indicative of the condition sensed by sensor 204. For example, if sensor 204 is configured to measure an amount of fuel disposed within the fuel tanks onboard supersonic aircraft 202, the information that processor 210 receives would relate to the amount of fuel detected. From this information processor 210 is able to calculate the weight of supersonic aircraft 202. If sensor 204 is configured to detect the pressure acting on supersonic aircraft 202, then the information that processor 210 receives would relate to the pressure conditions encountered by supersonic aircraft 202. From this information, processor 201 is able to calculate the velocity of supersonic aircraft 202.

Based on the information provided by sensor 204, processor 210 is able to determine the effect of the detected condition on wing 208. Specifically, depending upon the weight of supersonic aircraft 202, or the velocity at which it is flying, or on various other conditions, processor 210 is able to determine whether wing tip 212 is twisted, in which direction wing tip 212 is twisted, and, in some embodiments, to what extent wing tip 212 is twisted. Having determined that wing tip 212 is twisted, processor 210 is configured to send commands to control surface 206 to move, either up or down, to exert a counter-acting torque on wing 208 which will cause wing tip 212 to untwist.

FIGS. 12-15 illustrate how movement of control surface 206 can untwist wing tip 212.

Figure 12:
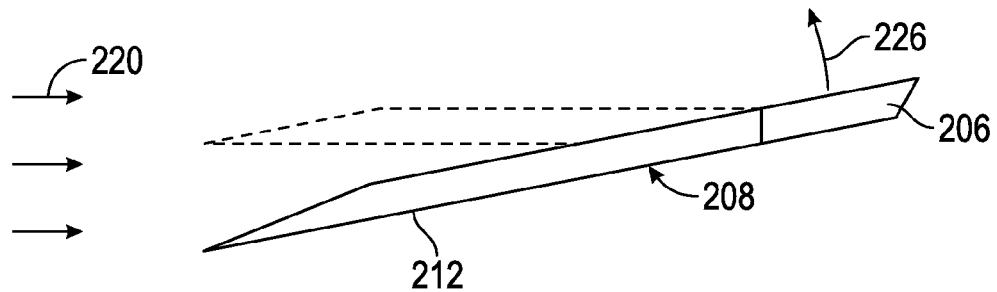
FIGS. 12-13 are schematic side views illustrating the system of FIG. 11 operating to reduce the magnitude of the sonic boom caused by a condition that causes a nose-down wing twist.

In FIG. 12, a schematic side view of wing 208 is presented. A supersonic free stream 220 is illustrated upstream of wing 208. With continuing reference to FIG. 11, supersonic aircraft 202 is experiencing a condition that has caused wing tip 212 to twist in a nose down direction as compared with its design-condition orientation (shown in phantom lines). Twisted in the manner illustrated, the lift distribution along supersonic aircraft 202 is shifted leading to an increase in the magnitude of the sonic boom generated by supersonic aircraft 202. Once the off-design condition is detected, corrective measures are taken. Processor 210 sends a command to actuator 214 to move control surface 206 in the direction indicated by arrow 222.

Figure 13:
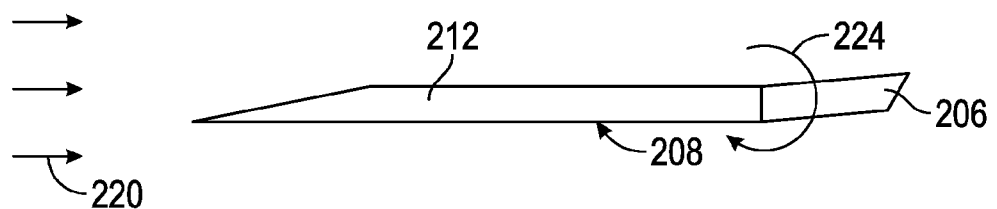

With continuing reference to FIGS. 11-12, FIG. 13 shows the effect of the corrective measure implemented by processor 210. Control surface 206 has rotated to a aft-edge-up position and in this position, control surface 206 is situated to interact with supersonic free stream 220 in a manner that causes control surface 206 to exert a torque 224 on wing 208. Torque 224 twists wing 208 in a direction opposite to the direction of twist caused by operation of supersonic aircraft 202 at the off-design condition. As a result, wing 208 is returned to a design orientation and the magnitude of the sonic boom generated by supersonic aircraft 202 is reduced.

Figure 14:
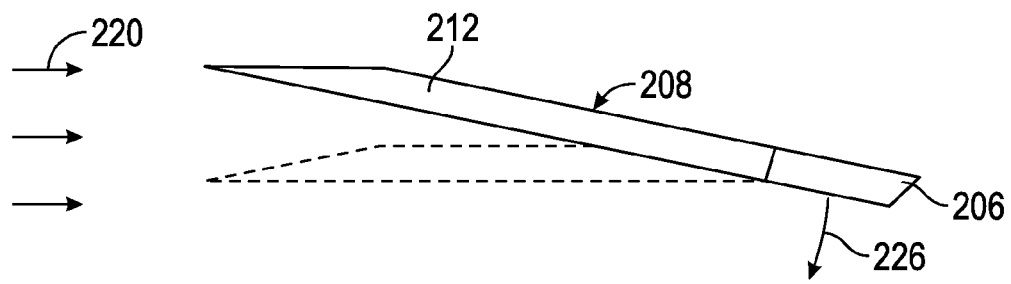
FIGS. 14-15 are schematic side views illustrating the system of FIG. 11 operating to reduce the magnitude of the sonic boom caused by a condition that causes a nose-up wing twist.
Figure 15:
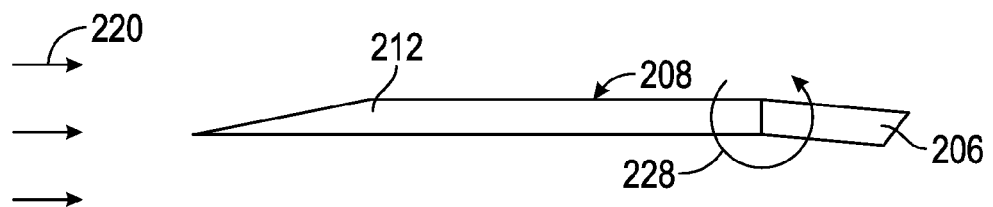

FIGS. 14-15 illustrate correction of a nose-up twist. With continuing reference to FIGS. 11-13, in FIG. 14, supersonic aircraft 202 is experiencing a condition that leads to a nose-up twist of wing tip 212. The design-condition orientation of wing tip 212 is illustrated in phantom lines. Once the condition that caused the twisting of wing tip 212 has been detected, processor 210 sends commands to actuator 214 to move control surface 206 in the direction indicated by arrow 226.

In FIG. 15, control surface 206 has moved to the illustrated aft-edge down position. In this position, control surface 206 interacts with supersonic free stream 220. This interaction exerts a torque 228 on wing 208. Torque 228 twists wing 208 in a direction opposite to the direction of twist caused by operation of supersonic aircraft 202 at the off-design condition. As a result, wing 208 is returned to a design orientation and the magnitude of sonic boom generated by supersonic aircraft 202 is reduced.

In some embodiments, sensor 204 will repeatedly monitor the condition of supersonic aircraft 202, and processor 210 will repeatedly receive information from sensor 204, determine that wing tip 212 is twisted, and will repeatedly send commands to move control surface 206 in a manner that causes wing 208 to twist in a counteracting manner. In other embodiments, system 200 will continuously engage in this cycle of detection and correction throughout the supersonic portion of the flight of supersonic aircraft 202. In still other embodiments, system 200 will continuously engage in this cycle of detection and correction throughout only a portion the supersonic portion of the flight of supersonic aircraft 202.

Figure 16:
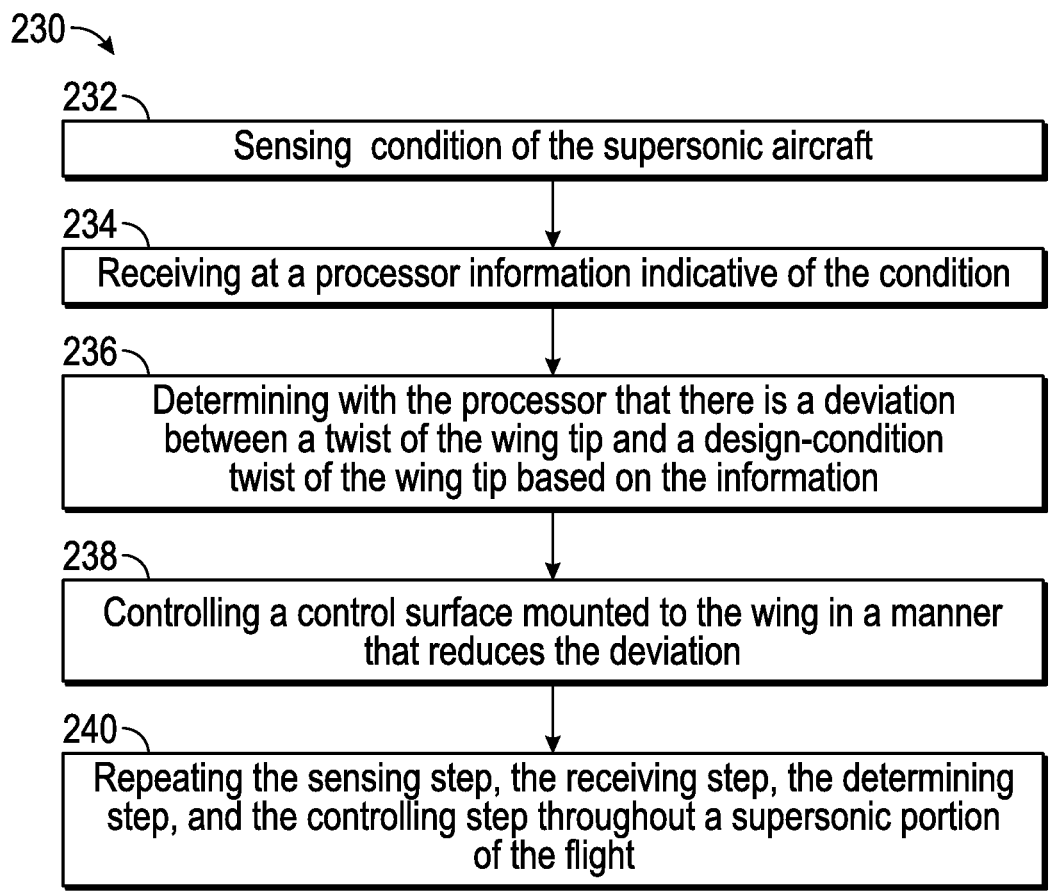
FIG. 16 is a flow diagram illustrating another non-limiting embodiment of a method for controlling a magnitude of a sonic boom caused by off-design-condition operation of a supersonic aircraft at supersonic speeds.

FIG. 16 is a flow diagram illustrating another non-limiting embodiment of a method 230 for controlling a magnitude of a sonic boom caused by off-design-condition operation of a supersonic aircraft at supersonic speeds.

At step 232, a condition of the supersonic aircraft is sensed. This may occur through the use of an appropriate sensor. The condition will correspond to a state of supersonic aircraft that cause its wing tips to twist in either a nose-up or a nose-down direction. In some examples, the condition may correspond to an off-design-condition weight or an off-design-condition velocity of the supersonic aircraft.

At step 234, a processor receives information regarding the sensed condition of the supersonic aircraft.

At step 236, the processor determines that there is a deviation between a twist of the wing tips and a design-condition orientation of the wing tips. This determination is made based, at least in part, on the information provided to the processor regarding the sensed condition.

At step 238, the processor issues commands that cause a wing-mounted control surface to move in a direction that reduces the deviation. For example, the processor may command the wing-mounted control surface to deflect in a direction that will cause it to exert a torque on the wing that has the effect of untwisting the wing to reduce or eliminate the undesired twist. For example, if the wing is twisted in a nose-down direction, the processor may control the wing-mounted control surface in a manner that deflects it in an aft-end up direction and if the wing is twisted in a nose-up direction, the processor may control the wing-mounted control surface in a manner that deflects it in an aft-end down direction. Such deflections will exert a counteracting torque on the wing and will cause the wing to come back into alignment with its desired orientation.

At step 240, steps 232, 234, 236, and 238 are repeated throughout the supersonic portion of the flight of the supersonic aircraft. In some embodiments, such repetition may occur continuously throughout the supersonic portion of the flight. In other embodiments, such repetition may occur continuously throughout only a portion of the supersonic portion of the flight.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A system for controlling a magnitude of a sonic boom of a supersonic aircraft at supersonic speeds, the system comprising:
   a first sensor configured to detect a first condition of the supersonic aircraft;
   a pair of wings configured to move; and
   a processor communicatively coupled with the sensor and operatively coupled with the pair of wings, the processor configured to:
      receive a first information from the first sensor, the first information indicative of the first condition of the supersonic aircraft,
      calculate a lift distribution of the supersonic aircraft based, at least in part, on the first information,
      determine an existence of a deviation of the lift distribution from a desired lift distribution based on the flight condition,
      calculate an amount and a direction of movement for the pair of wings that will reduce the deviation in response to determining the existence of the deviation, and
      control the pair of wings to move the amount and the direction of movement.

2. The system of claim 1, wherein the first sensor is configured to detect a velocity of the supersonic aircraft.

3. The system of claim 2, wherein the processor is configured to control the pair of wings to move forward or aft based on a deviation of either (1) a Mach number of the supersonic aircraft or (2) an equivalent airspeed of the supersonic aircraft from (1) a design-condition Mach number of the supersonic aircraft or (2) a design-condition equivalent airspeed of the supersonic aircraft, respectively.

4. The system of claim 1, wherein the first sensor is configured to detect a weight of the supersonic aircraft.

5. The system of claim 4, wherein the first sensor is configured to determine the amount of fuel onboard the supersonic aircraft.

6. The system of claim 4, wherein the processor is configured to control the pair of wings to move forward or aft based on a deviation of a weight of the supersonic aircraft from a design-condition weight of the supersonic aircraft.

7. The system of claim 1, further comprising a second sensor configured to detect a second condition of the supersonic aircraft, wherein the processor is communicatively coupled to second sensor and is configured to:
   receive a second information from the second sensor indicative of the second condition, and
   calculate lift distribution based, at least in part, on the second information.

8. The system of claim 7, wherein the first sensor is configured to detect a velocity of the supersonic aircraft and the second sensor is configured to detect a weight of the supersonic aircraft.

9. The system of claim 1, wherein the processor is configured to repeatedly receive the first information from the first sensor, calculate the lift distribution, determine the existence of the deviation, and control the pair of wings to move throughout a supersonic portion of a flight of the supersonic aircraft.

10. The system of claim 9, wherein the processor is configured to repeatedly receive the first information from the first sensor, calculate the lift distribution, determine the existence of the deviation, and control the pair of wings to move substantially continuously throughout the supersonic portion of the flight of the supersonic aircraft.

11. A method for controlling a magnitude of a sonic boom operation of a supersonic aircraft at supersonic speeds, the supersonic aircraft having a pair of wings configured to move, the method comprising the steps of:
    sensing a first condition of the supersonic aircraft;
    receiving, at a processor, a first information indicative of the first condition;
    calculating, with the processor, a lift distribution of the supersonic aircraft based, at least in part, on the first information;
    determining, with the processor, an existence of a deviation of the lift distribution from a desired lift distribution;
    calculating, with the processor, an amount and a direction of movement for the pair of wings that will reduce the deviation when the existence of the deviation has been determined;
    controlling, with the processor, the pair of wings to move the amount and the direction of movement.

12. The method of claim 11, wherein the sensing step comprises sensing a velocity of the supersonic aircraft.

13. The system of claim 12, wherein the processor is configured to control the pair of wings to move forward or aft based on a deviation of either (1) a Mach number of the supersonic aircraft or (2) an equivalent airspeed of the supersonic aircraft from (1) a design-condition Mach number of the supersonic aircraft or (2) a design-condition equivalent airspeed of the supersonic aircraft, respectively.

14. The method of claim 11, wherein the sensing step comprises sensing a weight of the supersonic aircraft.

15. The method of claim 14, wherein the sensing step comprise sensing an amount of fuel onboard the supersonic aircraft.

16. The system of claim 14, wherein the processor is configured to control the pair of wings to move forward or aft based on a deviation of a weight of the supersonic aircraft from a design-condition weight of the supersonic aircraft.

17. The method of claim 11, further comprising:
    sensing a second condition of the aircraft;
    receiving, at the processor, a second information indicative of the second condition; and
    calculating the position of the center of pressure based, at least in part, on the second information.

18. The method of claim 17, wherein sensing the first condition comprises sensing a velocity of the supersonic aircraft, and wherein sensing the second condition comprises sensing a weight of the supersonic aircraft.

19. The method of claim 11, wherein the sensing step, the receiving step, the calculating step, the determining step, and the controlling step are repeated throughout a supersonic portion of a flight of the supersonic aircraft.

20. The method of claim 19, wherein the sensing step, the receiving step, the calculating step, the determining step, and the controlling step are repeated substantially continuously throughout a supersonic portion of a flight of the supersonic aircraft.

* * * * *